(12) United States Patent
Xu et al.

(10) Patent No.: US 11,496,731 B2
(45) Date of Patent: Nov. 8, 2022

(54) STRING MATCHING WITH SINGLE COLOR VALUE

(71) Applicant: TENCENT AMERICA LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/231,737

(22) Filed: Apr. 15, 2021

(65) Prior Publication Data
US 2021/0385433 A1 Dec. 9, 2021

Related U.S. Application Data

(60) Provisional application No. 63/036,354, filed on Jun. 8, 2020.

(51) Int. Cl.
*H04N 19/105* (2014.01)
*H04N 19/176* (2014.01)
*H04N 19/186* (2014.01)
*H04N 19/157* (2014.01)

(52) U.S. Cl.
CPC ......... *H04N 19/105* (2014.11); *H04N 19/157* (2014.11); *H04N 19/176* (2014.11); *H04N 19/186* (2014.11)

(58) Field of Classification Search
CPC .. H04N 19/105; H04N 19/157; H04N 19/176; H04N 19/186
See application file for complete search history.

(56) References Cited

U.S. PATENT DOCUMENTS

| 2013/0010867 | A1 | 1/2013 | Ameres et al. | |
| 2015/0264348 | A1* | 9/2015 | Zou | H04N 19/593 |
| | | | | 375/240.02 |
| 2015/0271505 | A1* | 9/2015 | Ma | H04N 19/176 |
| | | | | 375/240.08 |
| 2015/0341643 | A1* | 11/2015 | Xu | H04N 19/176 |
| | | | | 375/240.02 |

(Continued)

OTHER PUBLICATIONS

"Hash Based Intra String Copy for HEVC Based Screen Content Coding"—Feng Zou, Ying Chen, Marta Karczewicz, Vadim Seregin; 2015 IEEE International Conference on Multimedia & Expo Workshops (ICMEW) (Year: 2015).*

(Continued)

*Primary Examiner* — Mainul Hasan
(74) *Attorney, Agent, or Firm* — Sughrue Mion, PLLC

(57) ABSTRACT

A method of decoding an encoded video bitstream using at least one processor includes determining, based on the encoded video bitstream, that a single-value string matching mode is enabled; obtaining, from the encoded video bitstream, an index indicating a reference sample within a set including a plurality of reference samples; based on the reference sample indicated by the index, determining a color value to be used for samples included in a current string of a current block; reconstructing the samples included in the current string based on the determined color value; and reconstructing the current block using the reconstructed current string.

17 Claims, 11 Drawing Sheets

(56) References Cited

U.S. PATENT DOCUMENTS

| | | | |
|---|---|---|---|
| 2015/0341655 A1* | 11/2015 | Joshi | H04N 19/50 375/240.16 |
| 2015/0373325 A1 | 12/2015 | Karczewicz et al. | |
| 2015/0373340 A1* | 12/2015 | Zou | H04N 19/186 375/240.24 |
| 2015/0381994 A1* | 12/2015 | Yu | H04N 19/176 375/240.24 |
| 2016/0182913 A1* | 6/2016 | Joshi | H04N 19/90 375/240.08 |
| 2016/0330455 A1 | 11/2016 | Lin et al. | |
| 2016/0345030 A1* | 11/2016 | Karczewicz | H04N 19/186 |
| 2017/0054988 A1 | 2/2017 | Lin et al. | |
| 2017/0064330 A1* | 3/2017 | Li | H04N 19/90 |
| 2018/0054629 A1* | 2/2018 | Ye | H04N 19/93 |
| 2018/0242023 A1* | 8/2018 | Lin | H04N 19/157 |
| 2019/0014325 A1 | 1/2019 | Lin et al. | |

OTHER PUBLICATIONS

International Search Report dated Jul. 27, 2021 in International Application No. PCT/US2021/029664.

Written Opinion of the International Searching Authority dated Jul. 27, 2021 in International Application No. PCT/US2021/029664.

Shan Liu et al., "Bit-depth Scalable Coding for High Dynamic Range Video", SPIE-IS&T, 2008, 10pgs.vol. 6822.

Xiaozhong Xu et al., "Block Vector Prediction in Intra Block Copy for HEVC Screen Content Coding", IEEE Computer Society, 2015, 10 pgs.

Dong Liu et al., "Deep Learning-Based Technology in Responses to the Joint Call for Proposals on Video Compression with Capability beyond HEVC", IEEE Transactions on Circuits and Systems for Video Technology, 2019, 14 pgs.

Benjamin Bross et al., "General Video Coding Technology in Responses to the Joint Call for Proposals on Video Compression with Capability beyond HEVC", IEEE Transactions on Circuits and Systems for Video Technology, 2019, 16 pgs.

Shan Liu et al., "Hybrid global-local motion compensated frame interpolation for low bit rate video coding", J. Vis. Commun. Image R., 2003, pp. 61-79, vol. 14.

Yingbin Wang et al., "Intra Block Copy in AVS3 Video Coding Standard", IEEE, 2020, 6 pgs.

Xiaozhonh Xu et al., "Intra Block Copy in HEVC Screen Content Coding Extensions", IEEE Journal on Emerging and Selected Topics in Circuits and Systems, 2006, 11 pgs.

Xiaozhong Xu et al., "Intra block copy in Versatile Video Coding with Reference Sample Memory Reuse" IEEE, 5 pgs.

Ximin Zhang et al., "Intra Mode Coding in HEVC Standard" 6 pgs.

Rajan Joshi et al., "Screen content coding test model 1 (SCM 1)", Joint Collaborative Team on Video Coding (JCT-VC) of ITU-T SG 16 WP 3 and ISO/IEC JTC 1/SC 29/WG 11, JCTVC-Q1014, Mar. 27-Apr. 4, 2014, 5 pgs., Valencia, ES.

Rajan Joshi et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11; Jun. 19-Jun. 26, 2015, 663 pgs., Warsaw, PL.

Shan Liu et al., "Joint Temporal-Spatial Bit Allocation for Video Coding With Dependency", IEEE Transactions on Circuits and Systems for Video Technology, Jan. 2005, 13 pgs., vol. 15, No. 1.

Benjamin Bross et al., Versatile Video Coding (Draft Joint Video Experts Team (JVET) of ITU-T SG 16 WP 3 and ISO/IEC JTC 1/SC 29/WG, JVET-K1001, 11, Jul. 10-18, 2018, 141 pgs.

Shan Liu et al., "Nonlinear motion-compensated interpolation for low-bit-rate video", Proc. SPIE 4115, Applications of Digital Image Processing XXIII, Dec. 28, 2000, 12 pgs.

Shan Liu et al., "Overview of HEVC extensions on screen content coding", SIP, 2015, 12 pgs., vol. 4.

Han Zhu et al., "Residual Convolutional Neural Network Based In-Loop Filter With Intra and Inter Frames Processed Respectively for AVS3", 6 pgs.

Chun-Chi Chen et al., "Screen Content Coding Using Non-Square Intra Block Copy for HEVC", 6 pgs.

* cited by examiner

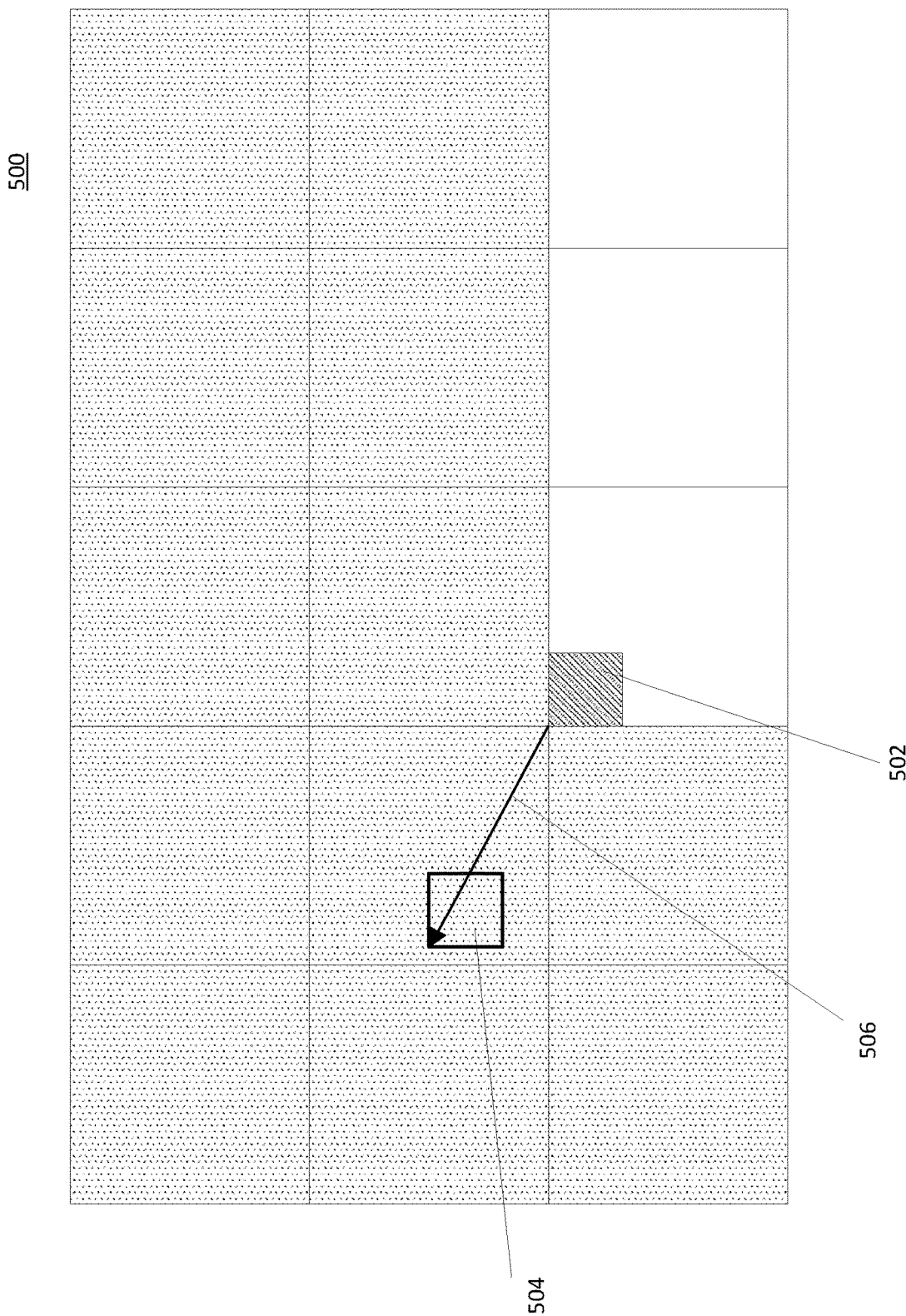

Computer System 1100

STRING MATCHING WITH SINGLE COLOR VALUE

CROSS-REFERENCE TO RELATED APPLICATION

This application claims priority under 35 U.S.C. § 119 to U.S. Provisional Application No. 63/036,354, filed on Jun. 8, 2020, in the United States Patent & Trademark Office, the disclosure of which is incorporated herein by reference in its entirety.

FIELD

The disclosed subject matter relates to video coding and decoding, and more specifically, to signaling a picture header in a coded video stream.

BACKGROUND

ITU-T VCEG (Q6/16) and ISO/IEC MPEG (JTC1/SC29/WG11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

In an embodiment, there is provided a method of decoding an encoded video bitstream using at least one processor, including: determining, based on the encoded video bitstream, that a single-value string matching mode is enabled; obtaining, from the encoded video bitstream, an index indicating a reference sample within a set including a plurality of reference samples; based on the reference sample indicated by the index, determining a color value to be used for samples included in a current string of a current block; reconstructing the samples included in the current string based on the determined color value; and reconstructing the current block using the reconstructed current string.

In an embodiment, there is provided a device for decoding an encoded video bitstream including: at least one memory configured to store program code; and at least one processor configured to read the program code and operate as instructed by the program code, the program code including: first determining code configured to cause the at least one processor to determine, based on the encoded video bitstream, that a single-value string matching mode is enabled; obtaining code configured to cause the at least one processor to obtain, from the encoded video bitstream, an index indicating a reference sample within a set including a plurality of reference samples; second determining code configured to cause the at least one processor to, based on the reference sample indicated by the index, determine a color value to be used for samples included in a current string of a current block; first reconstructing code configured to cause the at least one processor to reconstruct the samples included in the current string based on the determined color value; and second reconstructing code configured to cause the at least one processor to reconstruct the current block using the reconstructed current string.

In an embodiment, there is provided a non-transitory computer-readable medium storing instructions, the instructions including: one or more instructions that, when executed by one or more processors of a device for decoding an encoded video bitstream, cause the one or more processors to: determine, based on the encoded video bitstream, that a single-value string matching mode is enabled; obtain, from the encoded video bitstream, an index indicating a reference sample within a set including a plurality of reference samples; based on the reference sample indicated by the index, determine a color value to be used for samples included in a current string of a current block; reconstruct the samples included in the current string based on the determined color value; and reconstruct the current block using the reconstructed current string.

BRIEF DESCRIPTION OF THE DRAWINGS

Further features, the nature, and various advantages of the disclosed subject matter will be more apparent from the following detailed description and the accompanying drawings in which:

FIG. 5 is an illustration of intra picture block compensation, in accordance with an embodiment.

DETAILED DESCRIPTION

Figure 1:
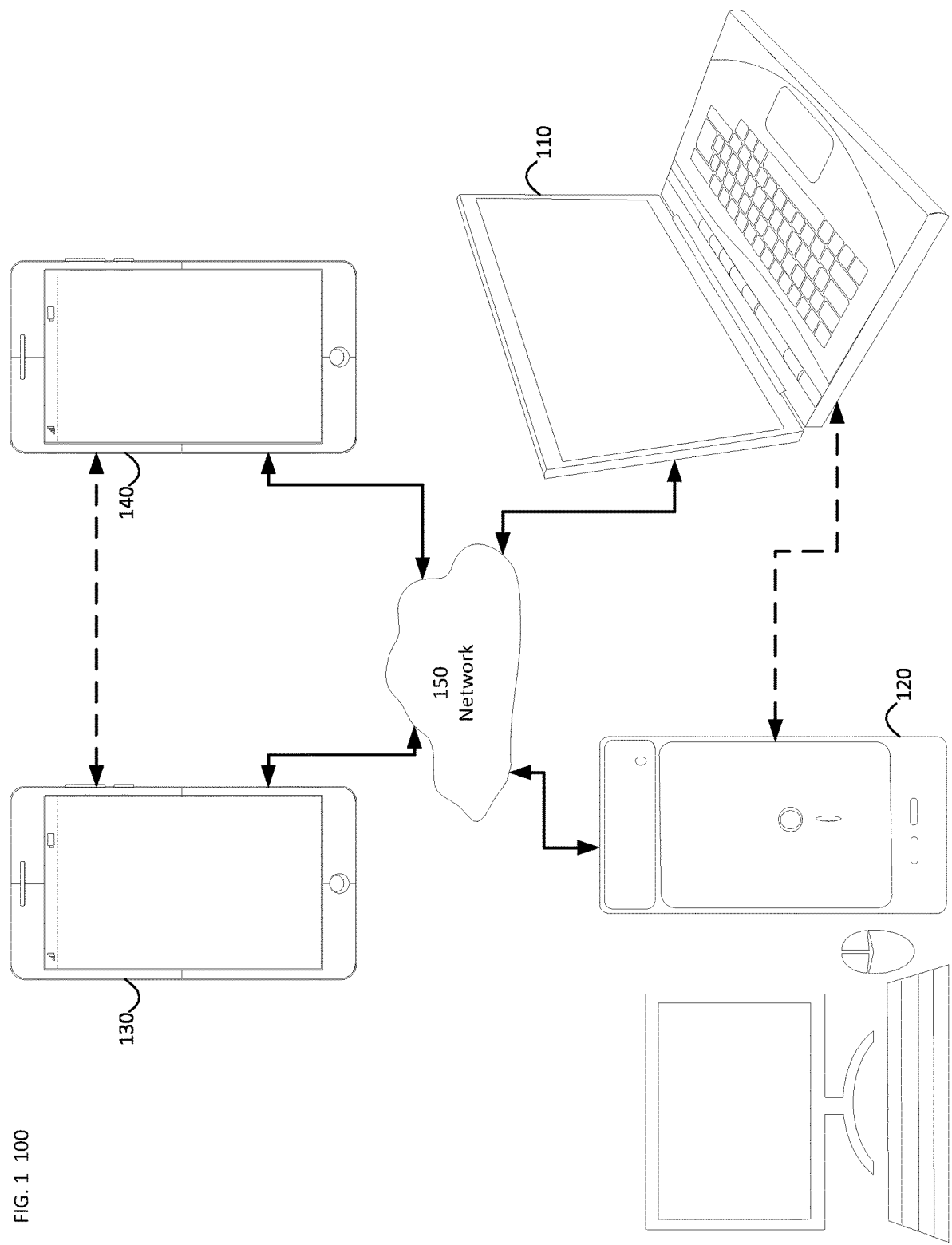
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
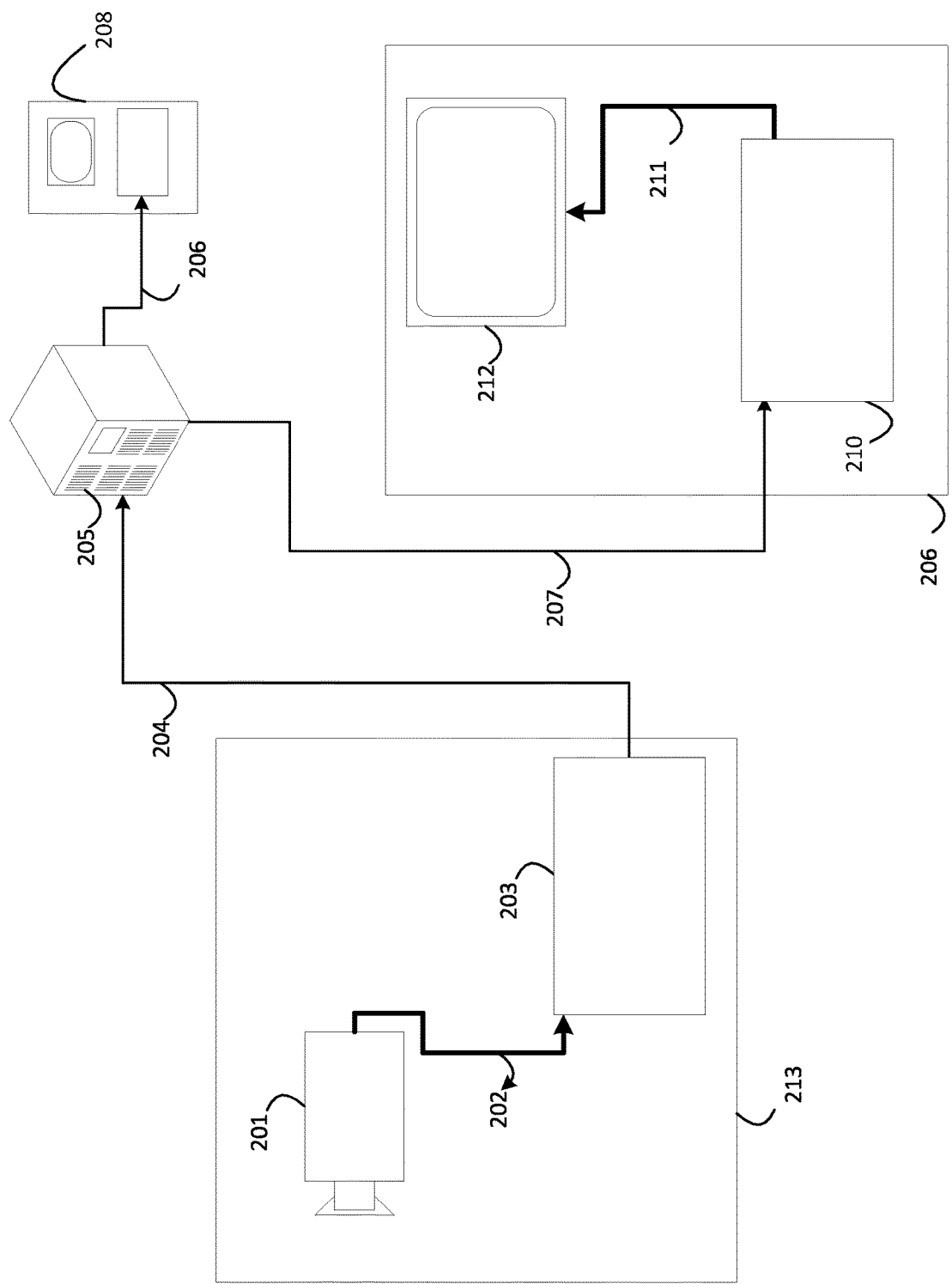
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
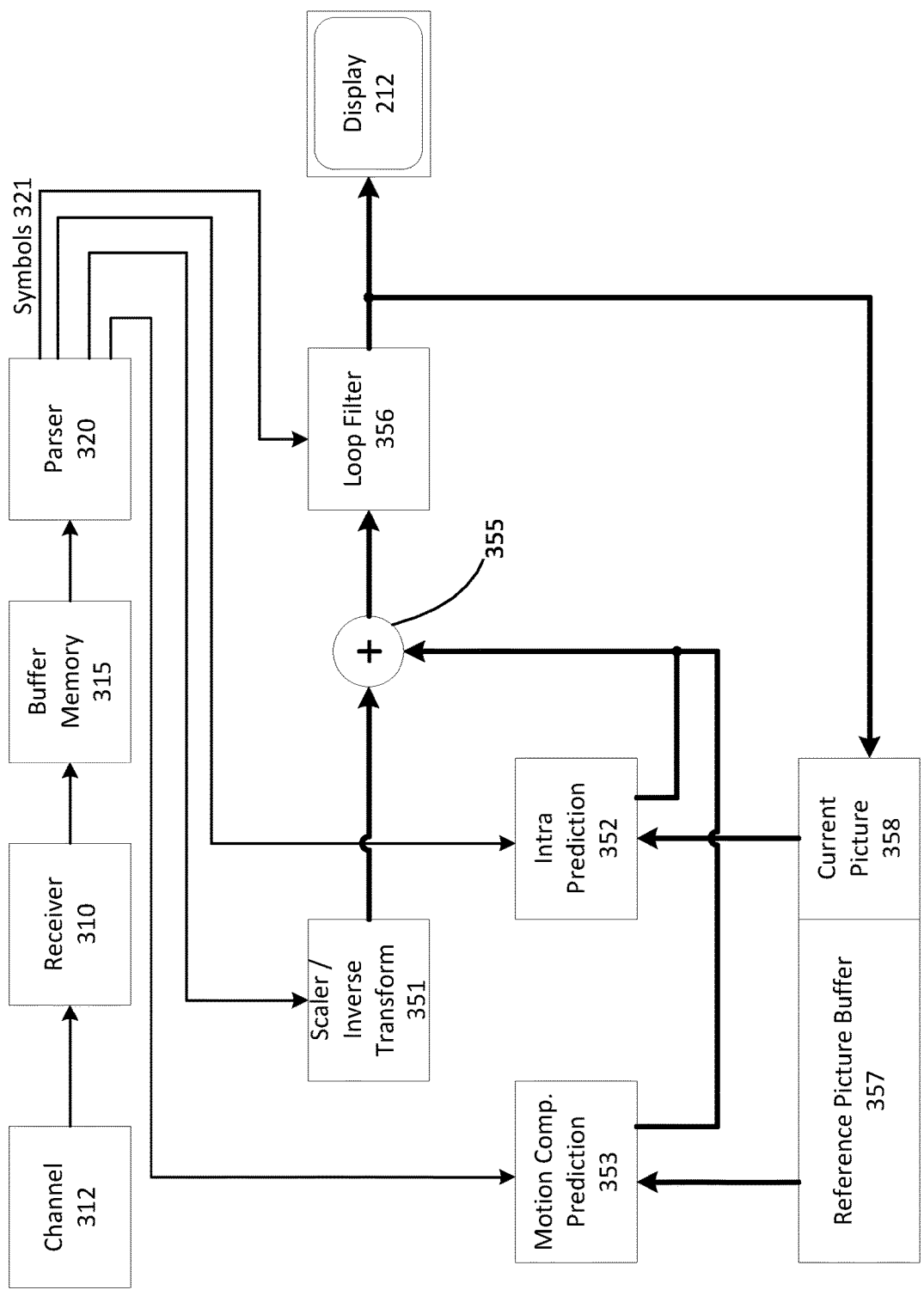
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
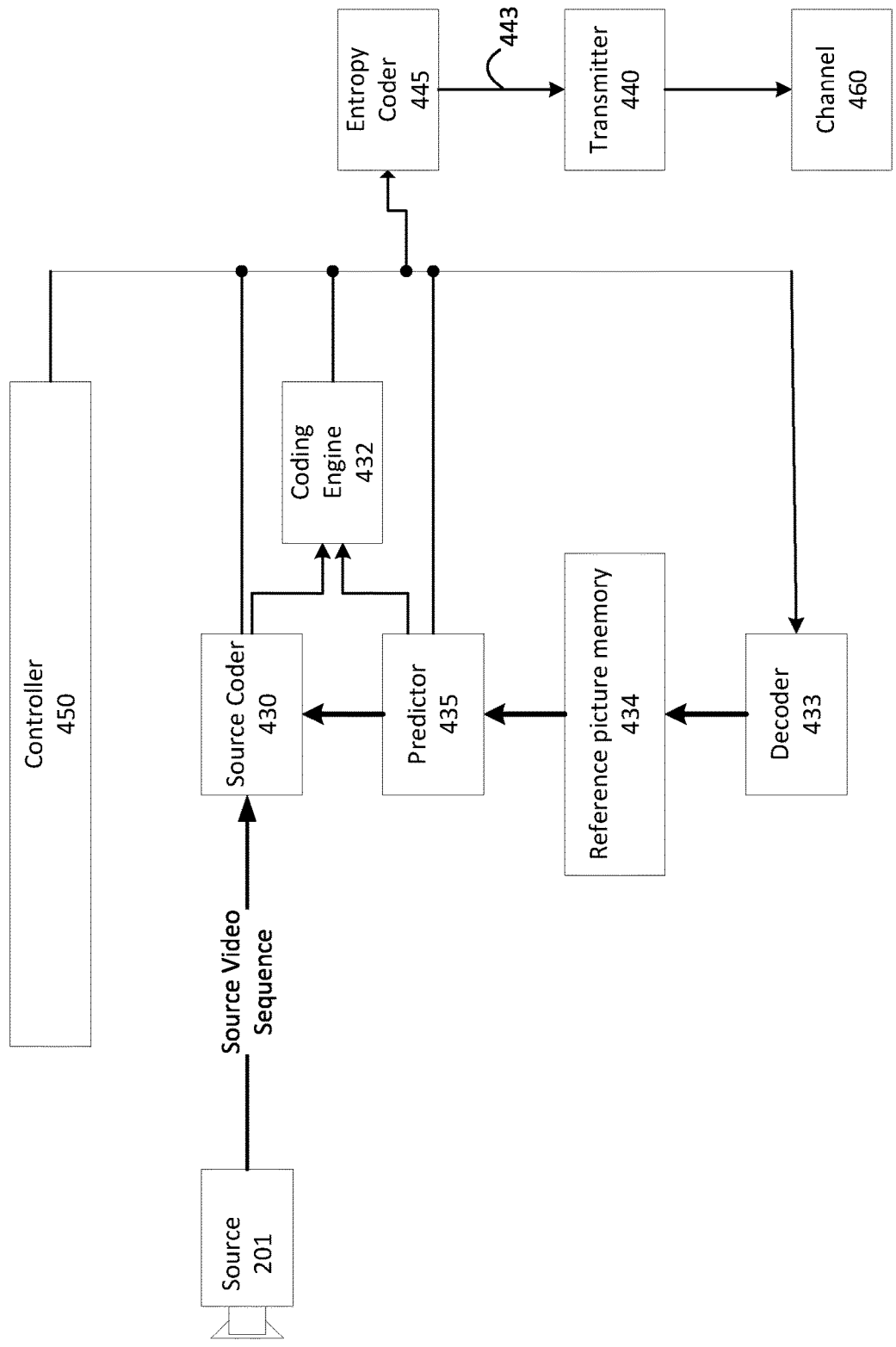
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Infra Block Copy

Block based compensation from a different picture is referred to as motion compensation. Similarly, a block compensation can also be done from a previously reconstructed area within the same picture. This is referred as intra picture block compensation, current picture referencing (CPR), or intra block copy (IBC). A displacement vector that indicates the offset between the current block and the reference block is referred as the block vector (BV). Different from a motion vector in motion compensation, which can be at any value (positive or negative, at either x or y direction), a block vector may have a few constraints such that it is ensured that the pointed reference block is available and already reconstructed. Also, for parallel processing consideration, some reference area that is tile boundary or wavefront ladder shape boundary is also excluded.

The coding of a block vector could be either explicit or implicit. In the explicit mode, which may be referred to as Advanced Motion Vector Prediction (AMVP) mode in inter coding, the difference between a block vector and its predictor is signaled; in the implicit mode, the block vector is recovered purely from its predictor, in a similar way as a motion vector in merge mode. The resolution of a block vector, in some implementations, is restricted to integer positions; in other systems, it may be allowed to point to fractional positions.

The use of intra block copy at block level, can be signaled using a block level flag, for example an IBC flag. In embodiments, this flag is signaled when the current block is not coded in merge mode. Or it can be signaled by a reference index approach. This is done by treating the current decoded picture as a reference picture. In HEVC SCC, such a reference picture is put in the last position of the list. This special reference picture is also managed together with other temporal reference pictures in the DPB.

There are also some variations for intra block copy, such as treating the intra block copy as a third mode, which is different from either intra or inter prediction mode. By doing this, the block vector prediction in merge mode and AMVP mode are separated from regular inter mode. For example, a separate merge candidate list is defined for intra block copy mode, where all the entries in the list are all block vectors. Similarly, the block vector prediction list in intra block copy AMVP mode only consists of block vectors. The general rules applied to both lists are: they may follow the same logic as inter merge candidate list or AMVP predictor list in terms of candidate derivation process. For example, the 5 spatial neighboring locations in HEVC or VVC inter merge mode are accessed for intra block copy to derive its own merge candidate list.

An example of intra block copy is shown in FIG. 5, which illustrates a current picture 500 in which a current block 502 is decoded based on a reference block 504 whose position is indicated by a block vector 506.

Currently in VVC, the search range of CPR mode is constrained to be within the current CTU. The effective memory requirement to store reference samples for CPR mode is 1 CTU size of samples.

Figure 6A:
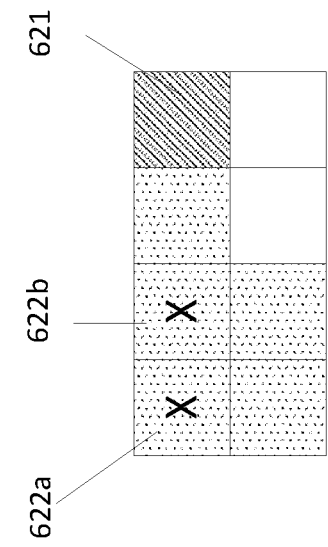
FIGS. 6A-6D are illustrations of intra picture block compensation with one CTU size search range, in accordance with an embodiment.
Figure 6B:
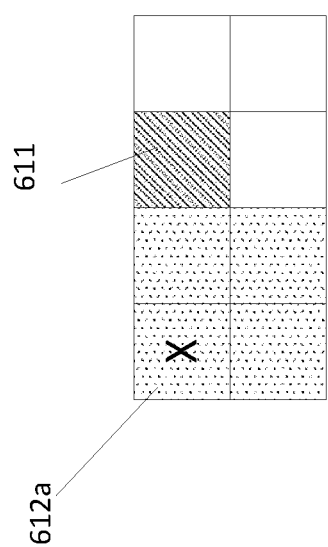
Figure 6C:
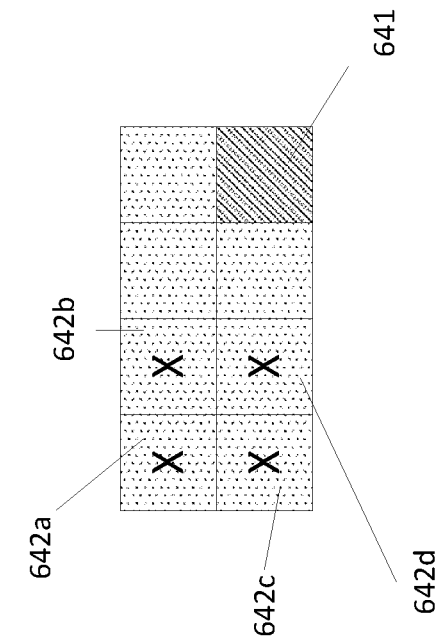
Figure 6D:
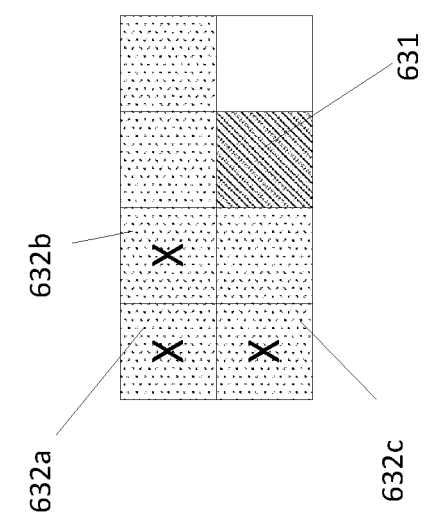

Examples of this are illustrated in FIGS. 6A-6D. For example, in FIG. 6A, reference sample 612$a$, marked with an X, is unavailable for current sample 611. Similarly, in FIG. 6B, reference samples 622$a$ and 622$b$ are unavailable for current sample 621. In FIG. 6C, reference samples 632$a$, 632$b$, and 632$c$ are unavailable for current sample 631, and in FIG. 6D, reference samples 642$a$, 642$b$, 642$c$, and 642$d$ are unavailable for current sample 641.

Considering the existing reference sample memory to store reconstructed samples in current 64×64 region, 3 more 64×64 sized reference sample memory are required. Accordingly, some embodiments discussed in greater detail below may extend the effective search range of the CPR mode to some part of the left CTU while the total memory requirement for storing reference pixels are kept unchanged (1 CTU size, 4 64×64 reference sample memory in total).

An example of bitstream conformance conditions that a valid block vector (mvL, in 1/16-pel resolution) may follow are listed below:

It may be a requirement of bitstream conformance that the luma motion vector mvL shall obey the following constraints:

A1: When the derivation process for block availability as specified in clause 6.4.X [Neighbouring blocks availability checking process] is invoked with the current luma location (xCurr, yCurr) set equal to (xCb, yCb) and the neighbouring luma location (xCb+(mvL[0]>>4), yCb+(mvL[1]>>4)) as inputs, and the output shall be equal to TRUE.

A2: When the derivation process for block availability as specified in clause 6.4.X [Neighbouring blocks availability checking process] is invoked with the current luma location (xCurr, yCurr) set equal to (xCb, yCb) and the neighbouring luma location (xCb+(mvL[0]>>4)+cbWidth−1, yCb+(mvL[1]>>4)+cbHeight−1) as inputs, and the output shall be equal to TRUE.

B1: One or both the following conditions shall be true:
The value of (mvL[0]>>4)+cbWidth is less than or equal to 0.

The value of (mvL[1]>>4)+cbHeight is less than or equal to 0.

C1: The following conditions shall be true:
(yCb+(mvL[1]>>4))>>CtbLog2SizeY=yCB>>CtbLog2SizeY
(yCB+(mvL[1]>>4))+cbHeight−1)>>CtbLog2SizeY=yCB>>CtbLog2SizeY
(xCb+(mvL[0]>>4))>>CtbLog2SizeY=>(xCb>>CtbLog2SizeY)−1
(xCb+(mvL[0]>>4)+cbWidth−1)>>CtbLog2SizeY<=(xCB>>CtbLog2SizeY) (8-975)

C2: When (xCb+(mvL[0]>>4))>>CtbLog2SizeY is equal to (xCb>>CtbLog2SizeY)−1, the derivation process for block availability as specified in clause 6.4.X [Neighbouring blocks availability checking process] is invoked with the current luma location(xCurr, yCurr) set equal to (xCb, yCb) and the neighbouring luma location (((xCb+(mvL[0]>>4)+CtbSizeY)>>(Ctb Log 2SizeY−1))<<(CtbLog2SizeY−1), ((yCb+(mvL[1]>>4)>>(CtbLog2SizeY−1))<<(CtbLog2SizeY−1) as inputs, and the output shall be equal to FALSE.

VVC/HEVC Spatial Merge Candidates

Figure 7:
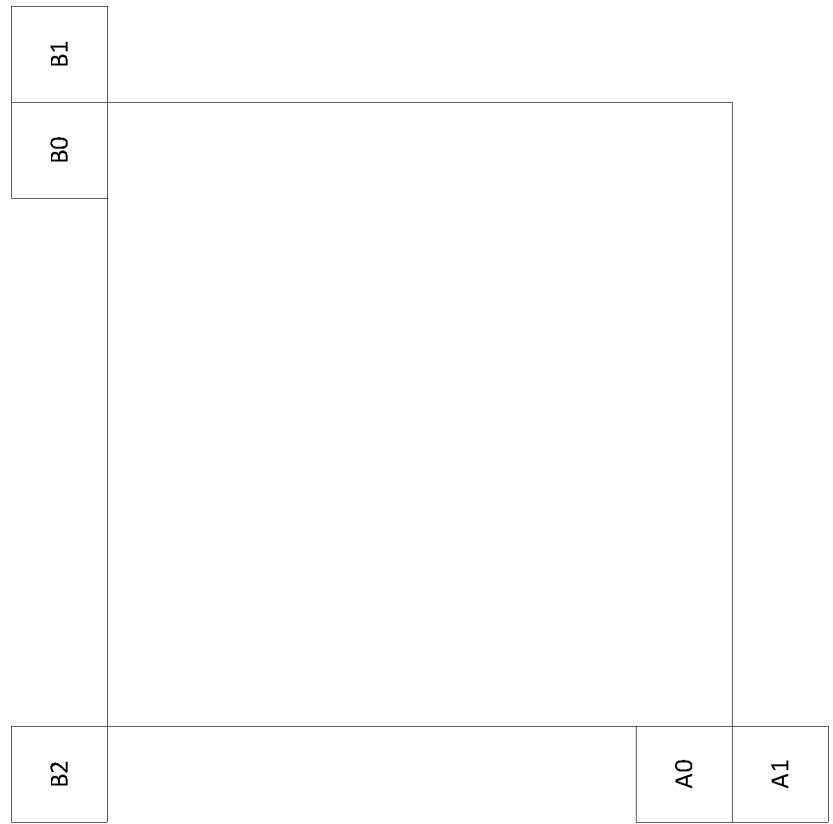
FIG. 7 is an illustration of positions of spatial merge candidates, in accordance with an embodiment.

FIG. 7 illustrates positions of five spatial merge candidates for HEVC and VVC. The order of forming a candidate list from these positions is: A0→B0→B1→A1→B2

History Based Motion Vector Prediction

When performing motion vector prediction (MVP), history-based motion vector prediction (HMVP) merge candidates may be added to merge list after the spatial MVP and temporal MVP (TMVP). In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM3 the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications may be introduced:

1) Number of HMVP candidates is used for merge list generation is set as (N<=4)?M:(8−N), wherein N indicates number of existing candidates in the merge list and M indicates number of available HMVP candidates in the table.

2) Once the total number of available merge candidates reaches the maximally allowed merge candidates minus 1, the merge candidate list construction process from HMVP is terminated.

When intra block copy operates as a separate mode from inter mode, a separate history buffer, referred as HBVP, will be used for storing previously coded intra block copy block vectors.

As a separate mode from inter prediction, it may be desirable to have a simplified block vector derivation process for intra block copy mode. A similar history-based block vector predictor buffer can be used to perform BV prediction. In the following, some information is provided for some specific usage of such a HBVP.

Class Based History-Based Block Vector Prediction

A HBVP buffer is established to record the previously IBC coded blocks' BV information, including some other side information such as block size, block location, etc.

Based on the recorded information, for each current block, BVs in the HBVP that meet the following conditions are classified into corresponding categories:

Class 0: The area of coded block (width*height) is greater than or equal to the threshold (64 pixels);

Class 1: The frequency of the BV is greater than or equal to 2;

Class 2: The coded block coordinates (upper left corner) are to the left of the current block;

Class 3: The coded block coordinates (upper left corner) are above the current block;

Class 4: The coded block coordinates (upper left corner) are at the upper left side of the current block;

Class 5: The coded block coordinates (upper left corner) are at the top right side of the current block;

Class 6: The coded block coordinates (upper left corner) are at the bottom left side of the current block.

For each category, the BV of the most recently coded block is derived as the BV predictor candidate. A CBVP list is constructed by appending the BV predictor of each category in the order from 0 to 6.

String Matching (String Copy)

A coded block may be divided into several continuous strings, each of which is followed by the next string along a scan order. The scan order can be raster scan or traverse scan. The scan direction can be vertical or horizontal oriented. For each string, a string offset vector (SV) and the length of the string (SL) are signalled. The SV is used to indicate where the reference string is from in the reference area. The length is used to indicate how long the current/reference string is.

Figure 8:
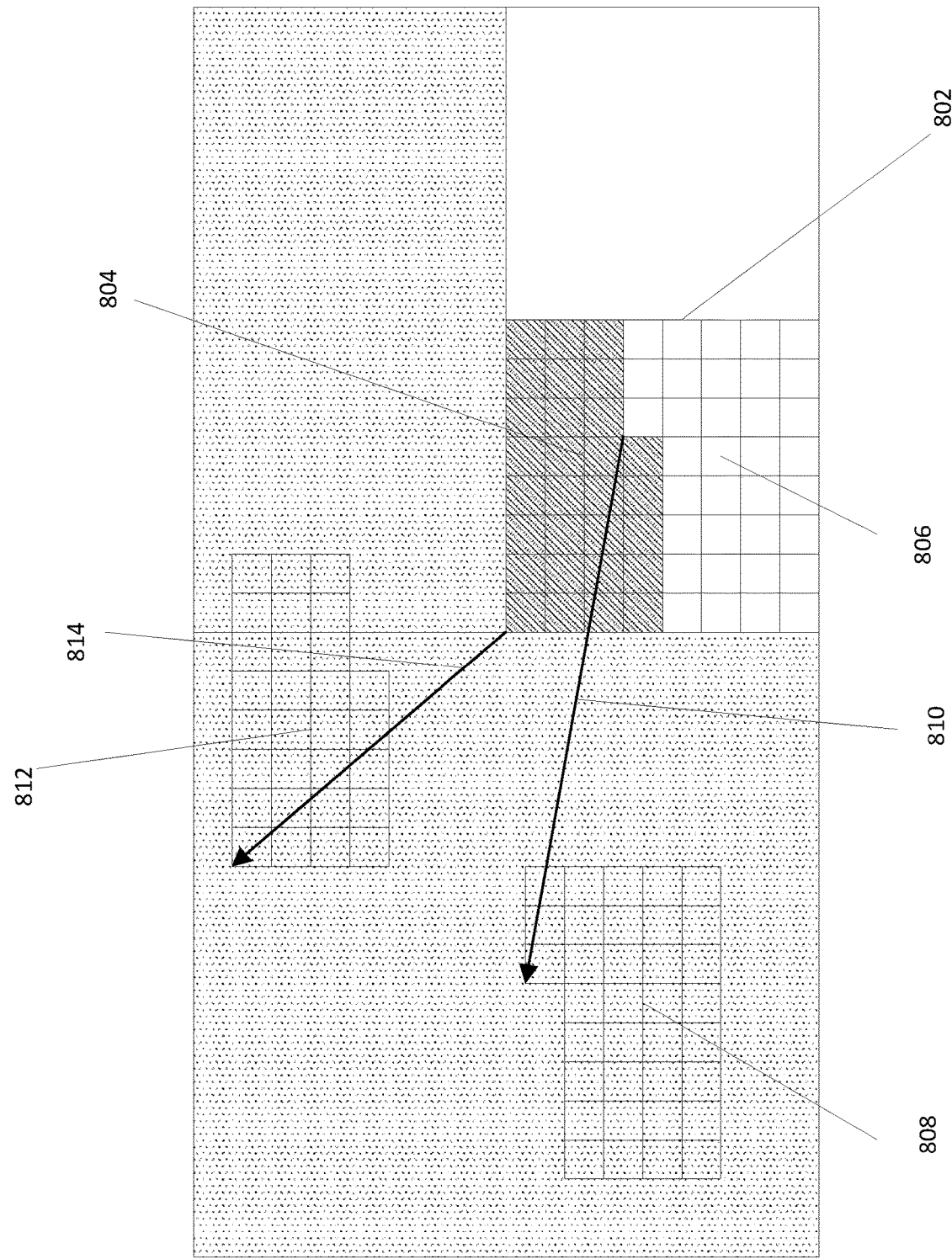
FIG. 8 is an illustration of a string match mode, in accordance with an embodiment.

An example of the string matching or string copy mode is shown in FIG. 8, where CU 802 which may be an 8×8 CU, is divided into two strings, for example string 804 and string 806, using raster scan order. String 804 includes the first 29 samples; string 806 includes the last 35 samples. References for string 804 and string 806 are indicated by the corresponding string offset vectors. For example, reference string 808 is indicated by string offset vector 810, and reference string 812 is indicated by string offset vector 814. The dotted area in FIG. 8 is the already reconstructed area that can be used for reference. If a sample in the current block cannot find its match in the reference area, an escape sample is signaled, and its value is coded directly.

In some previous methods, it is mentioned that a special string matching mode, which is called single value string, may be used to improve the coding efficiency. In this mode, the SV and SL are still signaled. But the samples in the entire string share the same color value. Therefore, the SV is used to point to which value in the reference area will this string use, instead of sample by sample copying from the reference area.

In single value string mode, the signaling cost of SV coding can be reduced to further improve the coding efficiency.

Palette Mode

Due to specific characteristics of screen contents, coding tools were developed for Screen Coding Extension of HEVC and VVC. The tools demonstrate significant gains in coding efficiency. Among them, the palette mode represents block of pixels using indices to the palette (major colors), and encode the palette and the indices by exploiting spatial redundancy. A typical palette mode coding method is composed of two parts: coding methods for the palette and coding methods for the samples using the palette. The latter part is composed of palette index coding, run length coding, and escape pixel coding. Here is some summary about the palette coding process. Details can be found in Versatile video coding (draft 2), ISO/IEC JTC1/SC29/WG11 JVET-K1001, the entirety of which is incorporated herein.

Selecting Major Colors

A very simple but efficient histogram based algorithm is used to classify pixels. In specific, the most significant L peak values in the histogram are selected as major colors, and the pixel values that are close to a major color will be quantized to the major color. Other pixels which do not belong to any major color sets are escape pixels, which will also be quantized before coding. For lossless coding, the quantization processes are not used. For each pixel, a color index is assigned to indicate which color set it belongs to. The color index may also be referred as an index for convenience when the term will not cause any confusion. If L major colors are used, the values of major colors 0 to (L−1) are signaled for the set of L major colors and the value of major color N is signaled for the escape pixel set. The palette is generally implemented as a color lookup table in which each color entry is associated with an index. A single palette is used to code both luma and chroma components. Each entry represents a specific RGB(YUV) color. For example, entry 1 with (R, G, B)=(0, 0, 0) represents pure black color while entry 0 with (R, G, B)=(2, 10, 200) represents a bluish color. When the video format is 420, the chroma plane are up sampled to generate the color palette.

Palette Mode Coding

The palette-based coding is performed on a CU basis.

Encoding the Palette Entries

To code the current palette using the palette predictor list as a reference, a binary vector is used to indicate whether each entry in the palette predictor list is reused in the current palette. The reused entries are placed at the beginning of the current palette, maintaining their order in the palette predictor list. This is followed by new palette entries which are not in the palette predictor list. A palette initializer with predefined entries can be optionally used to initialize the palette predictor list, resulting in improved coding efficiency in such a scenario. A palette initializer can be signaled in the picture parameter set (PPS) or the sequence parameter set (SPS).

The maximum allowed palette predictor size and palette size are either signaled in a high level syntax (such as in SPS), or as defined values agreed by both encoder and decoders.

For example, in SPS, the maximum predictor palette size is signaled to be 63, the maximum palette size is signaled to be 31. In another example, these two values are assumed by encoder and decoder without signaling.

Encoding the Color Index

After classification, the pixels of a block can be converted into color indices according to the major color set selected. A predictive coding method is applied to the indices, where a pixel line can be predicted by three different modes, including horizontal mode (i.e., copy index mode), vertical mode (i.e., copy above mode) and normal mode (i.e., escape mode). In the literature, two index scan orders are used when coding the color indices, namely horizontal traverse scan and vertical traverse scan. An index rotation flag is signaled to indicate which scan order is used.

Copy Index Mode

In copy index mode, starting from the first pixel, one or more consecutive indices are copied from the first pixel. The index of the first pixel is signaled.

Copy Above Mode

In this mode, one or more consecutive indices are copied from above pixel line.

Escape Mode

Then an escape pixel is encountered (signaled by the largest index in major color set), its corresponding pixel value is coded right after the index. There may be more than 1 escape pixels and in different color values in the CU. For different escape pixel locations, the pixel values of escape pixels may be different.

For each copy index mode, an index value is signaled. The index signaling is grouped in the front to improve the CABAC throughput. The escape values are signaled in the back due to the same reason. The copy index mode and copy above mode are signaled in between the indices coding and escape coding.

Separate Coding Tree Structure for Luma and Chroma Components

Traditionally, a coding unit contains samples of both the luma and chroma components. It was proposed in JVET that samples of chroma component may have an independent or separate split tree structure (referred also as dual-tree) as compared to luma component. Typically, such a separate coding tree structure starts from CTU level. Therefore, it is possible that a chroma CU (a CU that contains only two chroma components) can be larger than its luma counterpart at the corresponding sample location. In another case, to avoid the use of small chroma blocks (such as a CU with smaller than 4×4 chroma samples), "local dual-tree" was proposed in a way that the separate of luma and chroma coding starts from coding tree level, which is below the CTU level for dual-tree When some conditions are met (such as the parent CU size is smaller than or equal to some threshold), local dual-tree will be triggered and from then, luma and chroma coding are separated in a way similar as dual-tree at CTU level.

String Matching with Single Color Value

In the following, the term block may refer to a prediction block, a coding block, or a coding unit, i.e. CU. A string may refer to a set of continuous samples along the scan direction within a block, a single sample, or a block entirely.

Embodiments relate to using a set of selected samples or samples with predefined locations for prediction in single value string mode. Instead of signaling the SV for indication of which color to be used, an index pointing to one entry in the set will be signaled.

Specific examples 1-3 are discussed below, however these embodiments are merely examples and are not intended to be limiting.

Example 1

Figure 9:
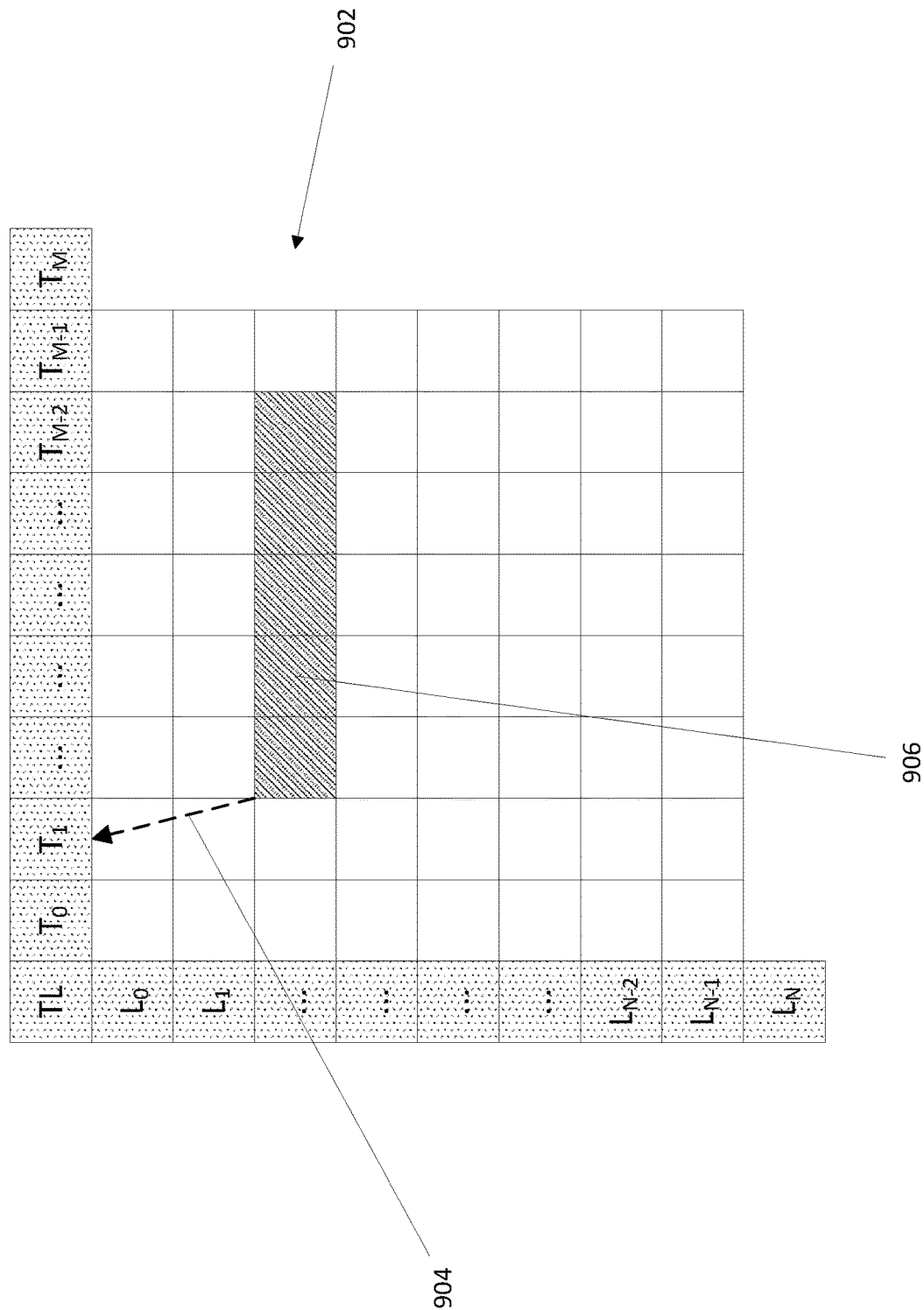
FIG. 9 is an illustration of single value string matching using neighboring reference samples, in accordance with an embodiment.

In embodiments, spatial neighboring reconstructed samples of the current block may be used to form the set to predict the single value string. For example, as shown in FIG. 9, a set of top reference samples (TL–$T_M$) and left reference samples (TL–$L_N$) to the current block 902 with M×N size are shown. In the example shown in FIG. 9, M=N=8, however this is not intended to be limiting. Further, in the example shown in FIG. 9, the index 904 indicates that $T_1$ is to be used as a reference for current string 906.

In embodiments, the left column and top row to the current block, which are used to perform intra prediction, may be used as the candidate set. An index can be used to select one from them. In FIG. 9, this set may refer to samples at TL, Tx (x=0, 1, . . . M, M+1, . . . ) and Ly (y=0, 1, . . . , N, N+1, . . . )

In embodiments, a subset of representing locations from those top/left neighbors may be selected to form the prediction set. In FIG. 9, this subset may refer to samples at locations of TL, $T_0$, $T_{[M/2]}$ (or $T_{[M/2-1]}$), $T_M$ (or $T_{[M-1]}$), and $L_0$, $L_{[N/2]}$ (or $L_{[N/2-1]}$), $L_N$ (or $L_{[N-1]}$), etc.

In embodiments, the neighboring locations may not need to be immediately adjacent to the current block, they may come from, for example, the row above $T_X$ in FIG. 9, the column to the left of $L_Y$ in FIG. 9, etc.

In embodiments, an ordering rule may be established for the selected samples to form the prediction set. In embodiments, the samples selected from the top go first, in order of from left to right; the samples selected from the left go second, in order of from top to bottom, etc.

In embodiments, for a selected sample location, if it is not available, several rules can be applied to indicate its value. Examples of such rules are:

Use the rules applied to intra prediction reference sample

Extended a valid reference from its neighbor (such as in FIG. 5, $T_{[M]}=T_{[M-1]}$ in case $T_{[M]}$ is not available)

Assign some default value

In embodiments, an index to the selected sample set may be signaled for indication of which sample is used to predict the current single value string.

In embodiments, a fixed length coding (with N bits) may be used and the number of samples in the prediction set may be smaller or equal to 2^N (where N is an integer value). In one example from above, $T_0$, $T_{[MN/2-1]}$, $T_{[M/2]}$, $T_{[M-1]}$, $L_0$, $L_{[N/2-1]}$, $L_{[N/2-1]}$, and $L_{[N-1]}$ may be chosen; in another example, similar rules in CCLM neighboring samples selection can be applied. That is, when top neighboring block is not available, top samples may be not selected, and instead, a doubled amount of samples may be chosen from left neighboring column; and when left neighboring block is not available, left samples are not chosen, and instead, a doubled amount of samples are chosen from top neighboring row; and when none of the two neighbors are available, this mode may be not used.

Example 2

In embodiments, the last sample of the previous string may be used as the prediction sample in the current single value string. This may be helpful when the previous string is not a single value string, so such a condition may be imposed to enable the use of such a sample.

In embodiments, if the current string is the first one in a block, the last sample may refer to TL, $T_0$, $L_0$ in FIG. 9. In particular, when horizontal scan order is used, $L_0$ may be used; when vertical scan order is used, $T_0$ may be used.

In embodiments, if combined with other prediction samples to form a set, an entry in the prediction sample set may be reserved for this sample. For example, the $1^{st}$ entry, or the last entry of the prediction set.

Example 3

In embodiments, a buffer with fixed size may be used to store previously reconstructed samples to form the set to predict the single value string.

In embodiments, those reconstructed samples may be from within the current coding block.

In embodiments, those reconstructed samples may come from outside the current coding block.

In embodiments, those reconstructed samples may be derived in a similar fashion as a palette predictor.

Figure 10:
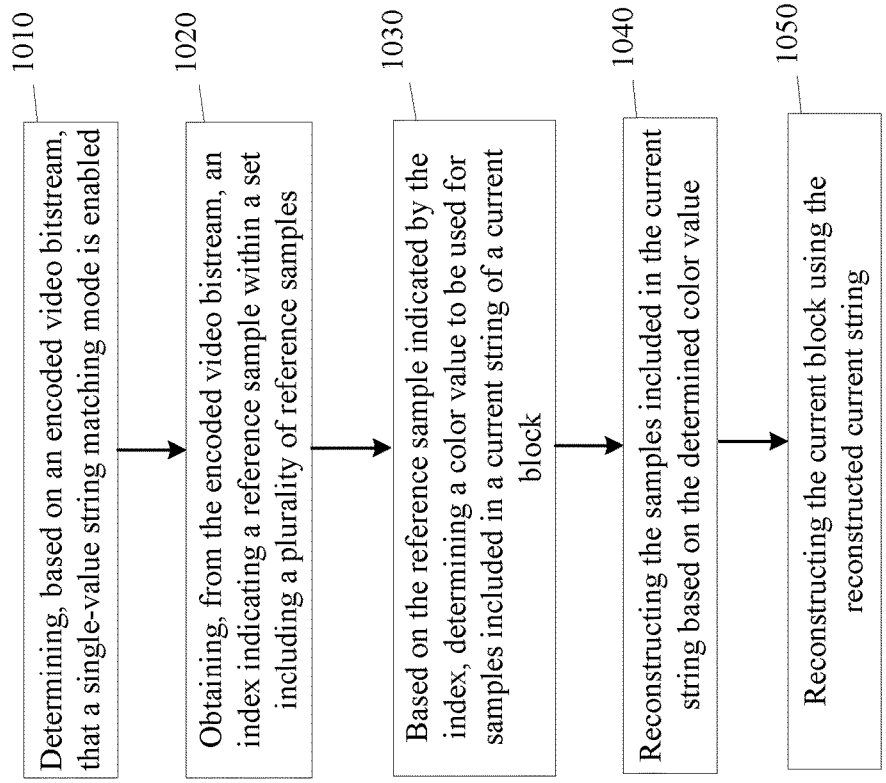
FIG. 10 is a flowchart of an example process for decoding an encoded video bitstream in accordance with an embodiment.

FIG. 10 is a flowchart of example process 1000 for decoding an encoded video bitstream. In some implementations, one or more process blocks of FIG. 10 may be performed by decoder 210. In some implementations, one or more process blocks of FIG. 10 may be performed by another device or a group of devices separate from or including decoder 210, such as encoder 203.

As shown in FIG. 10, process 1000 may include determining, based on the encoded video bitstream, that a single-value string matching mode is enabled (block 611).

As further shown in FIG. 10, process 1000 may include obtaining, from the encoded video bitstream, an index indicating a reference sample within a set including a plurality of reference samples (block 612).

As further shown in FIG. 10, process 1000 may include, based on the reference sample indicated by the index, determining a color value to be used for samples included in a current string of a current block (block 613).

As further shown in FIG. 10, process 1000 may include reconstructing the samples included in the current string based on the determined color value (block 614).

As further shown in FIG. 10, process 1000 may include reconstructing the current block using the reconstructed current string (block 614).

In embodiments, the current string may include a plurality of samples which are continuously located along a scan line within the current block.

In embodiments, the set may include reconstructed samples which spatially neighbor the current block.

In embodiments, the reconstructed samples may be selected from representative locations which are located at least one of above the current block or to a left of the current block.

In embodiments, the representative locations may be not immediately adjacent to the current block.

In embodiments, the set may include a last sample of a previous string of the current block.

In embodiments, the last sample of the previous string may be included within the set at a predetermined position of the set.

In embodiments, the set may be stored in a buffer having a fixed size.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 11 shows a computer system 1100 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, interne of things devices, and the like.

Figure 11:
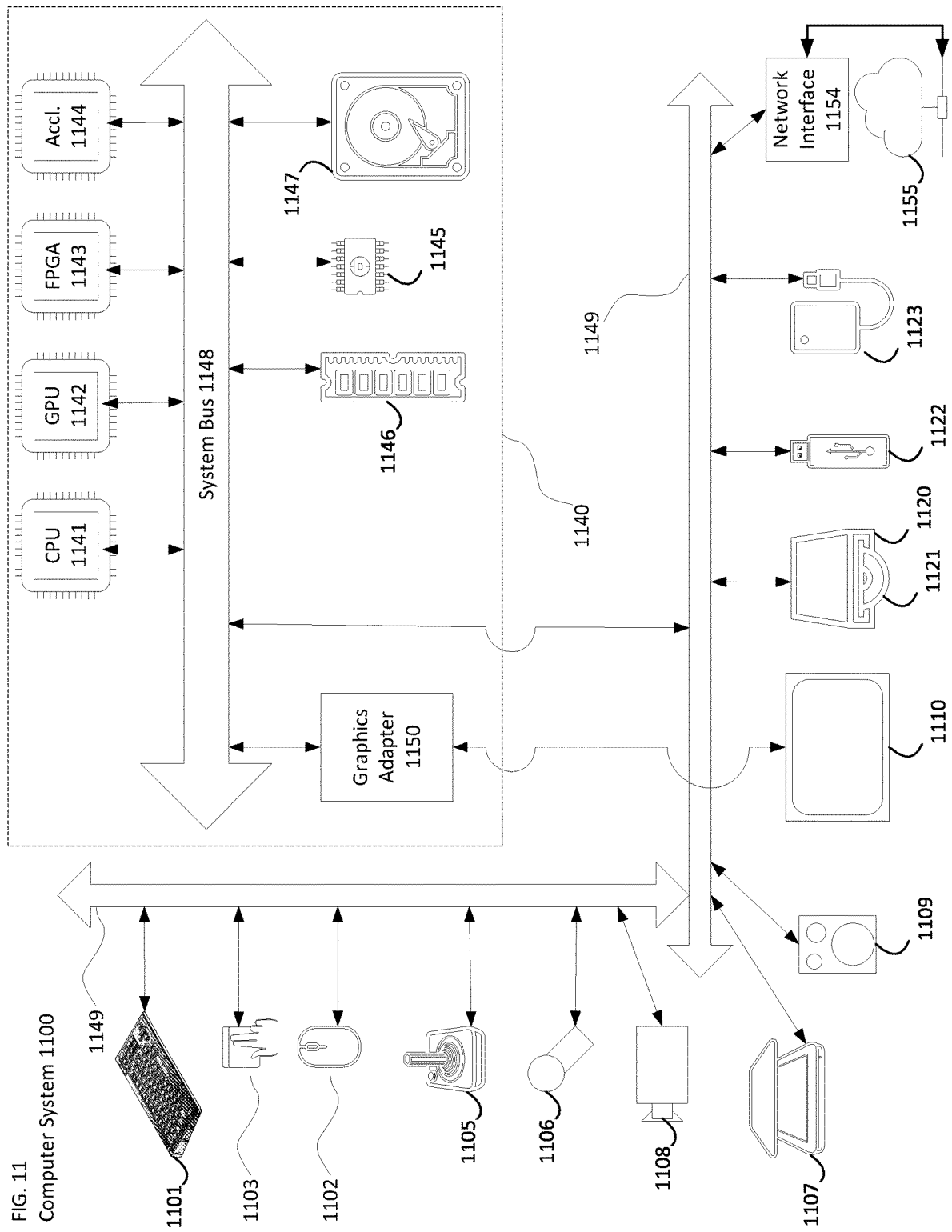
FIG. 11 is a schematic illustration of a computer system in accordance with an embodiment.

The components shown in FIG. 11 for computer system 1100 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110 and associated graphics adapter 1150, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data-glove, or joystick 1105, but there can also be tactile feedback devices that do not serve as input devices), audio output devices (such as: speakers 1109, headphones (not depicted)), visual output devices (such as screens 1110 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface(s) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (1154) that attached to certain general purpose data ports or peripheral buses (1149) (such as, for example universal serial bus (USB) ports of the computer system 1100; others are commonly integrated into the core of the computer system 1100 by attachment to a system bus as described below (for example Ethernet interface into a PC computer system or cellular network interface into a smartphone computer system). As an example, network 1155 may be connected to peripheral bus 1149 using network interface 1154. Using any of these networks, computer system 1100 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (1154) as described above.

Aforementioned human interface devices, human-accessible storage devices, and network interfaces can be attached to a core 1140 of the computer system 1100.

The core 1140 can include one or more Central Processing Units (CPU) 1141, Graphics Processing Units (GPU) 1142, specialized programmable processing units in the form of Field Programmable Gate Areas (FPGA) 1143, hardware accelerators 1144 for certain tasks, and so forth. These devices, along with Read-only memory (ROM) 1145, Random-access memory (RAM) 1146, internal mass storage such as internal non-user accessible hard drives, solid-state drives (SSDs), and the like 1147, may be connected through a system bus 1148. In some computer systems, the system bus 1148 can be accessible in the form of one or more physical plugs to enable extensions by additional CPUs, GPU, and the like. The peripheral devices can be attached either directly to the core's system bus 1148, or through a peripheral bus 1149. Architectures for a peripheral bus include peripheral component interconnect (PCI), USB, and the like.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can be also be stored in RAM 1146, whereas permanent data can be stored for example, in the internal mass storage 1147. Fast storage and retrieve to any of the memory devices can be enabled through the use of cache memory, that can be closely associated with one or more CPU 1141, GPU 1142, mass storage 1147, ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1100, and specifically the core 1140 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding an encoded video bitstream using at least one processor, the method comprising:
    determining, based on the encoded video bitstream, that a single-value string matching mode is enabled;
    obtaining, from the encoded video bitstream, an index indicating a reference sample within a set including a plurality of reference samples, wherein the set includes reconstructed samples which spatially neighbor the current block;
    based on the reference sample indicated by the index, determining a color value to be used for samples included in a current string of a current block;
    reconstructing the samples included in the current string based on the determined color value; and
    reconstructing the current block using the reconstructed current string.

2. The method of claim 1, wherein the current string comprises a plurality of samples which are continuously located along a scan line within the current block.

3. The method of claim 1, wherein the reconstructed samples are selected from representative locations which are located at least one of above the current block or to a left of the current block.

4. The method of claim 3, wherein the representative locations are not immediately adjacent to the current block.

5. The method of claim 1, wherein the set includes a last sample of a previous string of the current block.

6. The method of claim 5, wherein the last sample of the previous string is included within the set at a predetermined position of the set.

7. The method of claim 1, wherein the set is stored in a buffer having a fixed size.

8. A device for decoding an encoded video bitstream, the device comprising:
    at least one memory configured to store program code; and
    at least one processor configured to read the program code and operate as instructed by the program code, the program code including:
    first determining code configured to cause the at least one processor to determine, based on the encoded video bitstream, that a single-value string matching mode is enabled;
    obtaining code configured to cause the at least one processor to obtain, from the encoded video bitstream, an index indicating a reference sample within a set including a plurality of reference samples, wherein the set includes reconstructed samples which spatially neighbor the current block;
    second determining code configured to cause the at least one processor to, based on the reference sample indicated by the index, determine a color value to be used for samples included in a current string of a current block;
    first reconstructing code configured to cause the at least one processor to reconstruct the samples included in the current string based on the determined color value; and
    second reconstructing code configured to cause the at least one processor to reconstruct the current block using the reconstructed current string.

9. The device of claim 8, wherein the current string comprises a plurality of samples which are continuously located along a scan line within the current block.

10. The device of claim 8, wherein the reconstructed samples are selected from representative locations which are located at least one of above the current block or to a left of the current block.

11. The device of claim 10, wherein the representative locations are not immediately adjacent to the current block.

12. The device of claim 8, wherein the set includes a last sample of a previous string of the current block.

13. The device of claim 12, wherein the last sample of the previous string is included within the set at a predetermined position of the set.

14. The device of claim 8, wherein the set is stored in a buffer having a fixed size.

15. A non-transitory computer-readable medium storing instructions, the instructions comprising: one or more instructions that, when executed by one or more processors of a device for decoding an encoded video bitstream, cause the one or more processors to:
    determine, based on the encoded video bitstream, that a single-value string matching mode is enabled;
    obtain, from the encoded video bitstream, an index indicating a reference sample within a set including a plurality of reference samples, wherein the set includes reconstructed samples which spatially neighbor the current block;

based on the reference sample indicated by the index, determine a color value to be used for samples included in a current string of a current block;

reconstruct the samples included in the current string based on the determined color value; and reconstruct the current block using the reconstructed current string.

16. The non-transitory computer-readable medium of claim 15, wherein the set includes a last sample of a previous string of the current block.

17. The non-transitory computer-readable medium of claim 15, wherein the set is stored in a buffer having a fixed size.

\* \* \* \* \*